United States Patent
Phillips (10) Patent No.: US 7,311,399 B2
(45) Date of Patent: Dec. 25, 2007

(54) METHOD OF MAKING A THERMOPLASTIC-BASED ARTICLE AND A THERMOPLASTIC-BASED ARTICLE MADE THEREBY

(75) Inventor: Richard A. Phillips, South Dartmouth, MA (US)

(73) Assignee: Optical Enterprise, Inc., Marlborough, MA (US)

( * ) Notice: Subject to any disclaimer, the term of this patent is extended or adjusted under 35 U.S.C. 154(b) by 0 days.

(21) Appl. No.: 11/023,790

(22) Filed: Dec. 28, 2004

(65) Prior Publication Data

US 2005/0117113 A1 Jun. 2, 2005

Related U.S. Application Data

(63) Continuation-in-part of application No. 10/331,062, filed on Dec. 27, 2002, now Pat. No. 6,834,956.

(51) Int. Cl.
*G02C 7/02* (2006.01)

(52) U.S. Cl. .............. 351/177; 351/163; 351/44; 359/502

(58) Field of Classification Search ........... 351/163, 351/177
See application file for complete search history.

(56) References Cited

U.S. PATENT DOCUMENTS

| | | | |
|---|---|---|---|
| 2,237,567 A | 4/1941 | Land | 359/491 |
| 2,445,555 A | 7/1948 | Binda | 359/490 |
| 2,674,159 A | 4/1954 | Binda | 156/164 |
| 3,786,119 A | 1/1974 | Ortlieb | 264/1.32 |
| 3,940,304 A | 2/1976 | Schuler | 264/1.32 |
| 4,035,527 A | 7/1977 | Deeg | 427/169 |
| 4,090,830 A | 5/1978 | Laliberte | 425/117 |
| 4,944,584 A | 7/1990 | Maeda et al. | 351/172 |
| 5,051,309 A | 9/1991 | Kawaki et al. | 428/332 |
| 5,164,228 A | 11/1992 | Peralta | 427/164 |
| 5,223,862 A | 6/1993 | Dasher et al. | 351/163 |
| 5,246,499 A | 9/1993 | Peralta | 118/641 |
| 5,246,728 A | 9/1993 | Rodriguez | 427/2 |
| 5,286,419 A | 2/1994 | VanLigten et al. | 264/1.32 |
| 5,351,100 A | 9/1994 | Schwenzfeier et al. | 351/164 |
| 5,410,014 A | 4/1995 | Haese et al. | 528/196 |
| 5,434,707 A | 7/1995 | Dalzell et al. | 359/485 |
| 5,531,940 A | 7/1996 | Gupta et al. | 264/1.7 |
| 5,550,599 A | 8/1996 | Jannard | 351/159 |
| 5,648,832 A | 7/1997 | Houston et al. | 351/159 |
| 5,654,380 A | 8/1997 | Kawai et al. | 525/439 |
| 5,689,323 A | 11/1997 | Houston et al. | 351/41 |

(Continued)

*Primary Examiner*—Jessica T Stultz
(74) *Attorney, Agent, or Firm*—Opticus IP Law PLLC (57) ABSTRACT

An article, such as a lens article (10, 10', 10", 100) containing a first component, e.g., a filter (14, 14'), or component thereof, having a minimum degradation temperature, and a second component, e.g., a substrate (22, 22'), comprising a blend of first and second thermoplastic polymers. The first polymer, which has a glass transition temperature higher than the minimum degradation temperature of the first component, is selected based upon its ability to provide the article with one or more desirable characteristics. The second polymer is blended with the first polymer in a predetermined amount that provides the blend with an adjusted glass transition temperature lower than the minimum degradation temperature of the first component so that the first and second components can be heat processed together at a temperature greater than or equal to the adjusted glass transition temperature but below the minimum degradation temperature.

25 Claims, 3 Drawing Sheets

U.S. PATENT DOCUMENTS

| | | | |
|---|---|---|---|
| 5,753,145 A | 5/1998 | Teng et al. | 252/585 |
| 5,815,848 A | 10/1998 | Jarvis | 2/424 |
| 5,827,614 A | 10/1998 | Bhalakia et al. | 428/411.1 |
| 5,963,293 A | 10/1999 | Jannard | 351/45 |
| 5,969,789 A | 10/1999 | Houston et al. | 351/159 |
| 6,010,218 A | 1/2000 | Houston et al. | 351/159 |
| 6,038,705 A | 3/2000 | Jarvis | 2/424 |
| 6,065,836 A * | 5/2000 | Krishnan et al. | 351/163 |
| 6,168,271 B1 | 1/2001 | Houston et al. | 351/41 |
| 6,220,703 B1 | 4/2001 | Evans et al. | 351/163 |
| 6,256,152 B1 | 7/2001 | Coldrey et al. | 359/642 |
| 6,270,698 B1 | 8/2001 | Pope | 264/2.2 |
| 6,328,446 B1 | 12/2001 | Bhalakia et al. | 351/163 |
| 6,334,681 B1 | 1/2002 | Perrott et al. | 351/159 |
| 6,352,761 B1 * | 3/2002 | Hebrink et al. | 428/212 |
| 6,375,776 B1 * | 4/2002 | Buoni et al. | 156/209 |
| 6,392,802 B2 | 5/2002 | Miyatake et al. | 359/494 |
| 6,455,163 B1 | 9/2002 | Okamoto et al. | 428/412 |
| 6,498,683 B2 * | 12/2002 | Condo et al. | 359/589 |
| 6,627,300 B1 | 9/2003 | Kent et al. | 428/212 |
| 6,638,450 B2 | 10/2003 | Richard | 264/1.32 |
| 6,641,900 B2 | 11/2003 | Hebrink et al. | 428/212 |
| 6,650,473 B2 | 11/2003 | Nakagoshi | 264/1.32 |
| 6,659,608 B2 | 12/2003 | Yamamoto et al. | 351/163 |
| 6,801,360 B2 | 10/2004 | Phillips et al. | 359/490 |
| 6,926,405 B2 * | 8/2005 | Ambler et al. | 351/163 |
| 7,087,195 B2 * | 8/2006 | Kawasaki | 252/586 |
| 2001/0019182 A1 | 9/2001 | Hebrink et al. | 264/1.6 |
| 2002/0006469 A1 * | 1/2002 | Baillet et al. | 427/162 |
| 2002/0044352 A1 | 4/2002 | Yamamoto et al. | 359/483 |
| 2003/0090619 A1 | 5/2003 | Kumagai et al. | 349/194 |
| 2003/0118750 A1 | 6/2003 | Bourdelais et al. | 428/1.3 |
| 2004/0015187 A1 * | 1/2004 | Lendlein et al. | 606/228 |

* cited by examiner

METHOD OF MAKING A THERMOPLASTIC-BASED ARTICLE AND A THERMOPLASTIC-BASED ARTICLE MADE THEREBY

RELATED APPLICATION DATA

This application is a continuation-in-part application of U.S. patent application Ser. No. 10/331,062, filed Dec. 27, 2002 and titled, "Thermoformable Polarized Lens With Substrate Having Adjusted Glass Transition Temperature," now U.S. Pat. No. 6,834,956, that is incorporated by reference herein in its entirety.

FIELD OF THE INVENTION

The present invention generally relates to the field of manufacturing. In particular, the present invention is directed to a method of making a thermoplastic-based article and a thermoplastic-based article made thereby.

BACKGROUND OF THE INVENTION

Sometimes a material having one or more properties suited for use in a particular article of manufacture cannot be used because that material is not compatible with the process that is the most desirable for making the article. For example, in the context of polarized ophthalmic lenses, it is often desirable to attach a flexible polarizer to a rigid substrate to make a composite and then thermoform the composite to provide the curvature(s) necessary for the type of lens, e.g., plano, powered, multi-focal, etc., for which the composite will be used. After thermoforming, the composite may then be finished, e.g., by appropriately shaping its periphery to suit the finished lens and/or applying one or more optical coatings, such as a hardcoat, to the surfaces of the composite. Alternatively, the thermoformed composite may be used as pre-curved polarizing insert for a lens that, when finished, will include one or more additional optical layers attached to the insert. The resulting multilayer lens may then be finished in a manner similar to the manner mentioned, e.g., by appropriately shaping the periphery of the lens and/or applying one or more optical coatings to the surfaces of the lens.

Conventional polarizers used in ophthalmic lenses are often a sandwich of three thermoplastic layers. The middle layer is the polarizing layer, which frequently comprises a polyvinyl alcohol (PVA) layer containing either a hydrophilic dichroic dye or iodine that provides the polarizing property. The outer two layers are often made of the same material as each other, typically a cellulose-based polymer, such as cellulose aceto butyrate (CAB). Such polarizers provide very good polarizing performance, but they must not be heated to temperatures equal to or greater than their "minimum degradation temperature," i.e., the temperature at which their performance/quality noticeably degrades due to physical changes caused by the elevated temperature. If these polarizers are heated to their minimum degradation temperature or higher, particularly for a sustained period, they will often become unsuitable for use because the degradation caused by the elevated temperature will reach or exceed an acceptable limit.

For example, a conventional CAB-PVA-CAB polarizer sandwich typically has a minimum degradation temperature in a range of about 95° C. to about 120° C., depending upon the particular formulation of the various layers. Relative to the CAB part of the polarizer, the amount and type of degradation generally depends on time and the internal constituents of the CAB. When such a polarizer is heated to or above its minimum degradation temperature, the CAB degrades, typically by yellowing in the first instance, followed by the development of air bubbles and/or blisters and increased stiffness. Similar degradation also occurs with cellulosetriacetate (CTA) but at slightly higher temperatures. Other degradation may also occur, depending upon the makeup of the polarizer. For example, depending upon the adhesive used bond the CAB layers to the PVA layer, the bond may separate in places and cause blisters among the layers. In another example wherein iodine is the polarizing substance incorporated into the PVA, the iodine's ability to provide a polarizing effect begins to irreversibly degrade at a temperature of about 100° C. (the minimum degradation temperature) by changing color. Moisture affects the amount and speed of the degradation; the higher the moisture content, the greater and faster is the degradation. Starting around 120° C., the polarizer begins to fade and lose polarizing efficiency.

Unfortunately, some of the most desirable thermoplastics for the substrate, based on their optical and durability properties, e.g., pure polycarbonates and some pure methacrylates, e.g., poly (methyl methacrylate) (PMMA), have glass transition temperatures that are higher than the minimum degradation temperatures of the polarizers. For example, a pure polycarbonate typically has a glass transition temperature in a range of about 135° C. to about 155° C., and a pure methacrylate typically has a glass transition temperature in a range of about 105° C. to about 110° C. Therefore, a manufacturing process that includes thermoforming the substrate and polarizer together with one another, which generally requires the substrate to be heated to its glass transition temperature or higher, would not be suitable because this temperature is higher than the minimum degradation temperature of the polarizer. Consequently, the polarizer would degrade, likely to an unacceptable extent. It is noted that in a thermoforming process that includes heating the article to a temperature lower than the glass transition temperature at issue and subjecting it to relatively large pressure is often not an acceptable alternative for ophthalmic lenses due to the residual stresses that this process imparts into article. Besides, even the lower temperatures used in this alternative are often higher than the minimum degradation temperature of the polarizer.

SUMMARY OF THE INVENTION

In one aspect, the present invention is directed to a method of making an article. The method comprises the step of providing a first component having a minimum degradation temperature. A second component is provided that includes a polymer blend that contains a first polymer having a first glass transition temperature higher than the minimum degradation temperature. The polymer blend has a second glass transition temperature adjusted downward from said first glass transition temperature. The first component and second component are placed into working relation with one another so as to form a composite. The composite is thermally processed at a temperature below the minimum degradation temperature.

In another aspect, the present invention is directed to a method of making an article that includes a first component and a second component thermally processed in conjunction with the first component, the first component having a minimum degradation temperature and the second component having at least one desired characteristic. The method comprises selecting a first polymer for the second component based on the ability of the first polymer to provide the at least one desirable characteristic, the first polymer having a glass transition temperature higher than the minimum degradation temperature. As second polymer is blended with the first polymer so as to adjust the glass transition temperature lower than the minimum degradation temperature so that the first and second components can be thermally processed at a temperature lower than the minimum degradation temperature.

In a further aspect, the present invention is directed to an article comprising a first component having a minimum degradation temperature. A second component is located in working relation with the first component. The second component has at least one characteristic and comprises a blend of a first polymer and a second polymer. The first polymer is selected based on its ability to provide the at least one characteristic and has a glass transition temperature greater than the minimum degradation temperature. The second polymer is selected to adjust the glass transition temperature to a temperature lower than the minimum degradation temperature.

BRIEF DESCRIPTION OF THE DRAWINGS

For the purpose of illustrating the invention, the drawings illustrate forms of the invention that are presently preferred. However, it should be understood that the present invention is not limited to the precise arrangements and instrumentalities shown in the drawings, wherein.

DETAILED DESCRIPTION OF THE DRAWINGS

In the following detailed description of various embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention may be determined from the appended claims.

Figure 1:
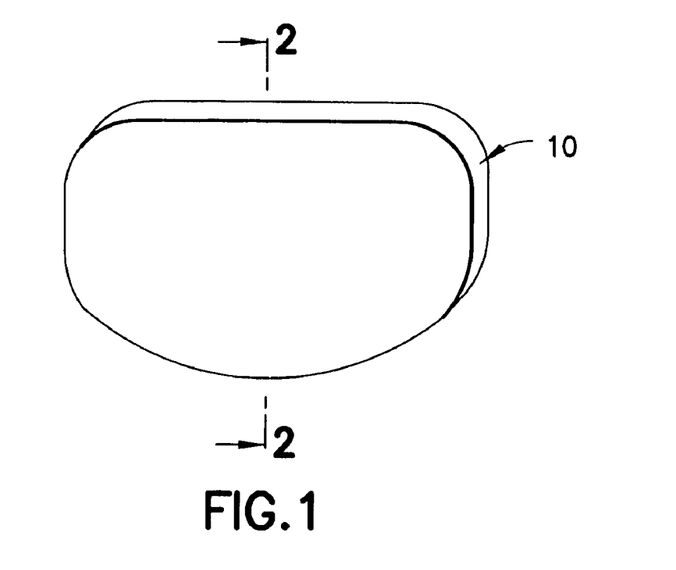
FIG. 1 is a perspective view of a thermoplastic-based article of the present invention.

Referring now to the drawings, in general the present invention is directed to a method of making a thermoplastic-based article, such as, e.g., the ophthalmic lens article 10 shown in FIG. 1. Ophthalmic lens "article" 10 is referred to as such because it can be either a lens in and of itself or, alternatively, an insert for incorporating into a finished lens, e.g., as described below in connection with FIG. 4. Like all thermoplastic articles, during manufacturing lens article 10 or a portion thereof is subjected to one or more elevated temperatures that are generally significantly higher than the temperatures that the article will experience during its intended use. These elevated temperatures may be due to any one or more of the following: molding, thermoforming, extrusion and annealing, among others.

As noted in the Background section above, certain thermoplastics have properties that are well-suited to a particular application. For example, in the context of lens article 10, it is known that polycarbonate is well-suited for ophthalmic lenses due to various desirable characteristics, such as its optical clarity, hardness, toughness and relatively high index of refraction. However, while polycarbonate may be desirable for reasons relating to its optical and durability characteristics, certain properties of polycarbonate, such as its glass-transition temperature, can increase the difficulty of incorporating various desirable features into lens article 10.

Figure 2:
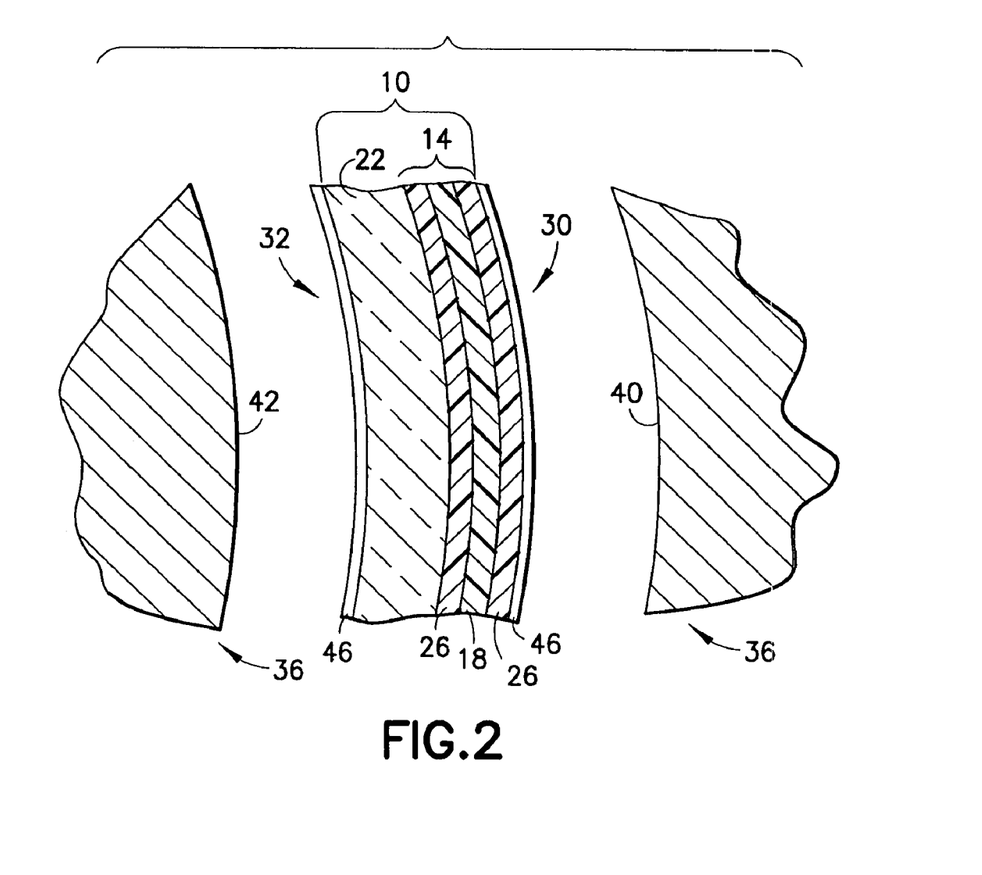
FIG. 2 is a partial cross-sectional view of a mold assembly and the thermoplastic-based article of FIG. 1 taken along line 2-2 of FIG. 1.

For example, as illustrated in FIG. 2, it may be desirable to provide lens article 10 with a filter 14 comprising a filtering layer 18 placed in working relation with a substrate 22 in any suitable manner known in the art. Filtering layer 18 may be provided with at least one of a polarizing function or a photochromic function, among others. In the context of polarizing, filter layer 18 may comprise a suitable thermoplastic, such as a polyvinyl alcohol (PVA), e.g., polyvinylene, or polyacetelyne, containing iodine or a dichroic substance, such as Chloratine Fas Red, Chrysophenine, Sirius Yellow, Bensopurpurine, Direct Fast Red, Brilliant Blue 6B, Chlorasol Black BH, Direct Blue 2B, Direct Sky Blue, Diamine Green, Congo Red and Acid Black, among others, or mixtures thereof, that provides this layer with a polarizing ability. Filter layer 18 may be sandwiched between two protective layers 26 made of, e.g., a cellulosic material, such as cellulose aceto butyrate (CAB), among others, so as to form a standalone filter laminate. Generally, filter 14 is attached to substrate 22, which generally provides a relatively robust structure for supporting the filter, which is typically relatively thin and flexible, as those skilled in the art will appreciate. When filter 14 is a photochromic filter, a suitable photochromic substance, such as naphthopyrans, spironapthopyrans, fulgides, fulgimides, salicylates, triazoles, oxazoles, azobenzenes and silver halide, among others, may be incorporated into filtering layer 18, which may also include a material, e.g., CAB, polypropylene, poly(vinyl chloride) and poly(vinyl acetate), among others, suitable for containing or supporting the selected substance. Such a photochromic filtering layer 18 may be attached to substrate 22 directly or, optionally, first sandwiched between protective layers 26, if necessary, before being attached to the substrate by appropriate means, such as adhesive bonding.

In one method of manufacturing lens article 10, substrate 22 is provided in flat sheet or flat plate form, and filter 14 is attached to the flat substrate to form the article prior to providing the article with its desired contour(s), such as curvature(s) or stepped multi-focal contour(s), e.g., by thermoforming. (It is noted that the convex side 30 and the concave side 32 may be provided with the same or different curvature as required to achieve a particular result. It is also noted that it may be desirable to anneal lens article 10 after thermoforming in order to relieve residual stresses in the article.) As discussed in the Background section above, it is well-known that iodine-based polarizers, such as a polarizing version of filter 14, can be damaged by exposure to elevated temperatures. For example, the iodine in a PVA/iodine polarizer generally begins to deteriorate at a temperature (i.e., the minimum degradation temperature) in a range of about 95° C. to about 120° C., thereby degrading or destroying the polarizer's polarizing ability.

Higher temperatures can also be detrimental to protective layers 26. For example, the CAB layers of a CAB/PVA/CAB polarizer generally begin to degrade at a temperature in a range of about 95° C. to about 120° C., typically by yellowing in the first instance, thereby rendering the polarizer unsuitable. In addition, depending on the adhesive (not shown) used to bond the protective layers 26 to filter layer 18 and/or filter 14 to substrate 22, elevated temperatures can cause the protective layers and/or filter to blister. Such blistering would render lens article 10 unacceptable for its intended purpose.

Polycarbonates, e.g., those sold under the trademarks LEXAN® and MAKROLON® by General Electric Corporation and Bayer Corporation, respectively, generally have a glass-transition temperature in a range of about 135° C. to about 155° C. Consequently, if substrate 22 were made of one of these polycarbonates, it would generally be necessary to raise the temperature of the substrate and filter 14 to at least the glass transition temperature of that polycarbonate, i.e., about 135° C. or higher, in order to thermoform and/or anneal lens article 10. However, heating filter 14 to such a temperature would exceed its minimum degradation temperature. Therefore, despite polycarbonate being a highly desirable material from optical and durability viewpoints, it is generally not desirable from a manufacturability viewpoint.

Although a pure polycarbonate would generally not be suitable for use as substrate 22 in the manufacturing process described above due to the deterioration of filter 14 caused during thermoforming and/or annealing, the pure polycarbonate (i.e., the first polymer) may be blended, or copolymerized, with a second polymer other than polycarbonate, e.g., polyethylene teraphthalate, so as to essentially reduce the glass transition temperature of the polycarbonate to an adjusted glass transition temperature that will allow lens article 10 to be thermoformed and/or annealed at a temperature lower than the minimum degradation temperature of filter 14. This concept may be readily extended not only to carbonates other than polycarbonate (see below), but also to other polymers generally. Those skilled in the art will readily understand how to apply the basic concepts of the present invention to myriad polymers based on the particular thermoplastic-based article being considered and the characteristics that are desirable for the component of that article at issue. Consequently, it is not necessary to provide an exhaustive list of all permutations of polymer blends. However, a few examples are provided herein for a more robust disclosure. It is noted that the second polymer blended with the first polymer that provides the desirable characteristics is typically, but not necessarily, not from the same group as the first polymer. For example, if the first polymer is a carbonate, the second polymer is typically, but again not necessarily, not a carbonate.

Other examples of carbonate blends having glass-transition temperatures lower than pure polycarbonate and lower than the temperature at which filter 14 would start to degrade include certain ones of the blends made of aliphatic polyester-carbonates incorporating "diaryl carbonates" disclosed in U.S. Pat. No. 5,654,380 (e.g., the carbonate blend disclosed in Example 1 has a glass-transition temperature of 104° C.) and the blend disclosed in U.S. Pat. No. 5,410,014, which discloses a copolymer of aromatic-aliphatic polycarbonate having a glass transition temperature of about 119° C. Each of U.S. Pat. Nos. 5,654,380 and 5,410,014 are incorporated herein by reference in their entireties.

In one particular embodiment, substrate 22 may comprise a blend of 70 parts of polycarbonate to 30 parts of polyethylene teraplithalate that has an adjusted glass transition temperature of about 121° C. This blend is commercially available under the trademark XYLEX® from the General Electric Company. It has been observed that sheets of this blend can be thermoformed at temperatures between about 120° C. and about 140° C. Clearly, at the upper end of this range this particular blend is not suitable for use with an iodine/PVA-based polarizer, which has a minimum degradation temperature in a range of about 95° C. to about 120° C. based on the presence of iodine. However, the lower end of the range may be suitable for such a polarizing layer. That said, experiments performed to date have shown that thermoforming at the lower end of the range can be non-uniform.

In another embodiment in which substrate 22 comprises a 50 parts to 50 parts blend of polycarbonate and polyethylene teraphthalate (also available from General Electric under the trademark XYLEX®) having an adjusted glass transition temperature of about 87° C., it has been observed that sheets of this blend can be readily thermoformed at about 95° C. Referring to FIG. 2, the curvatures of sides 30, 32 of lens article 10 thermoformed at 95° C. using the thermoforming assembly 36 of FIG. 2 matched, respectively, the curvatures of surfaces 40, 42 of the thermoforming assembly. This relatively low thermoforming temperature is suitable for avoiding degradation of the iodine/PVA-based polarizer discussed in the preceding paragraph.

If lens article 10 is to be a lens, as opposed to an insert, one or more optical coatings, such as hardcoat layers 46, may be provided to the article on each of sides 30, 32. This would typically be done after lens article 10 has been thermoformed.

In addition, or alternatively, to one or more dichroic dyes being incorporated into filter 14, one or more dichroic dyes may be incorporated directly into substrate 22. Indeed, in alternative embodiments of article 10 having photochromic properties without polarizing properties, filter need not be provided. In this case, the photochromic dye(s) could be incorporated only in substrate. In this connection, some photochromic dyes have been reported to not perform well in polymers with high glass transition temperatures and perform better in polymers with lower glass transition temperatures. Some photochromic dyes have two geometrical forms, e.g., one form "open" and the other form "closed," and the photochromic action is accompanied by opening and closing the molecule. In a matrix having a low glass transition temperature, the matrix has greater mobility and the photochromic molecule can change forms more readily. Consequently, substrate 22 in this scenario could be a polymer blend having a glass transition temperature adjusted in the manner described above in connection with the embodiment incorporating filter. In this case, the glass transition temperature of substrate 22 may be adjusted prior to adding any photochromic dyes thereto. Suitable polymer blends for supporting direct addition of one or more photochromic dyes may include any of the exemplary blends discussed above, including the methacrylate/butyldyene blend and the polycarbonate/polyethylene teraphthalate blend, among others.

Figure 3:
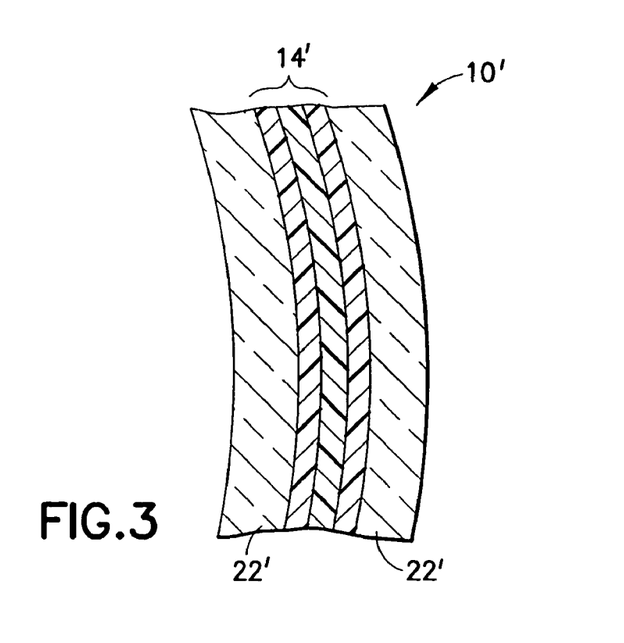
FIG. 3 is a partial cross-sectional view of an alternative thermoplastic-based article of the present invention.

FIG. 3 shows an alternative lens article 10' of the present invention that may also be used as a filtering lens or a filtering insert in manner similar to the manner described above relative to lens article of FIGS. 1 and 2. Rather than having a single blended-polymer substrate 22 to which filter 14 is attached as with lens article 10 of FIG. 2, lens article 10' of FIG. 3 includes two blended-polymer layers 22' attached to opposite sides of a filter 14'. Similar to lens article 10' of FIGS. 1 and 2, lens article 10' of FIG. 3 would typically be assembled with substrates 22' in flat-plate form, such that the entire article, including filter 14', would need to be thermoformed in order achieve the contours shown in FIG. 3. Filter 14' may be any filter suitable for lens article 10', such as the polarizer-type or photochromic filter 14 shown and described above relative to FIG. 2.

Like substrate 22 of FIG. 2, each substrates 22' of FIG. 3 may contain a polymer blend that includes a first polymer selected primarily for its ability to provide lens article 10' with one or more desirable characteristics as discussed above. Also similar to the discussion above, each substrate 22' further includes a second polymer blended with the first polymer in a predetermined amount so as to essentially lower the glass transition temperature of the first polymer so that lens article 10' can be thermally processed, e.g., thermoformed and/or annealed, at a temperature that will not unacceptably degrade filter 14', or any of its components.

Figure 4:
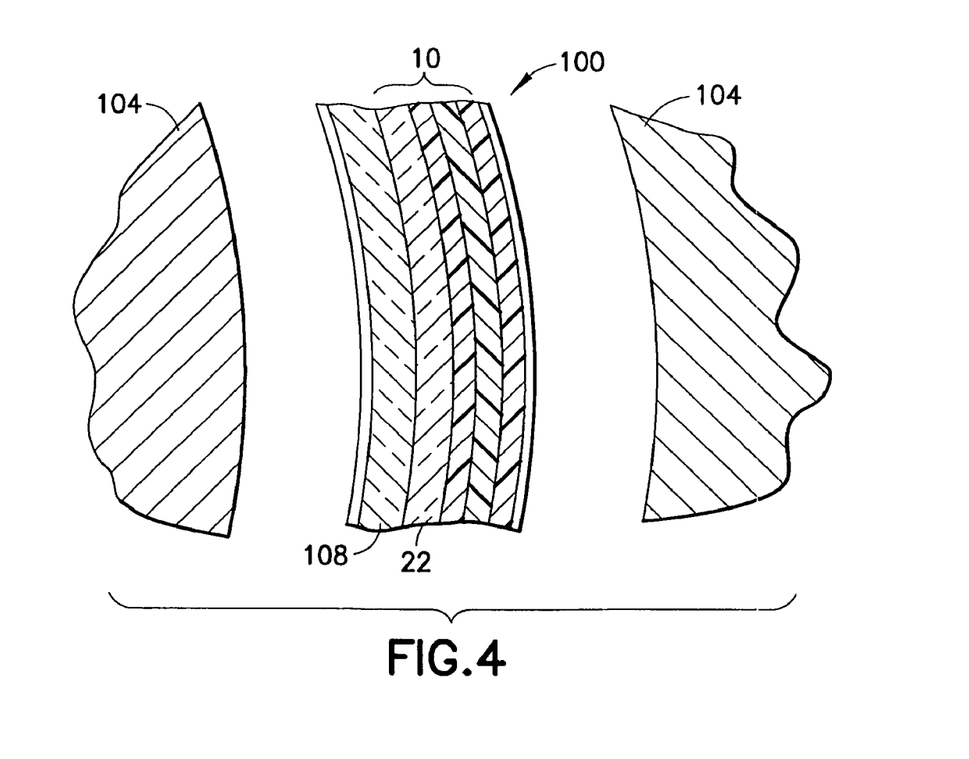
FIG. 4 is a partial cross-sectional view of a mold assembly and another alternative thermoplastic-based article of the present invention.

FIGS. 4 illustrates lens article 10 of FIGS. 1 and 2 being used as a filtering insert for an ophthalmic lens 100. In one embodiment, lens 100 is made by placing article 10 between mold parts 104 of an injection molding or injection/coining machine (not shown) and injecting or injecting/coining a high-impact polymer layer 108 against the concave side of the article. In an alternative embodiment, high-impact polymer layer 108 may be formed on the convex side of lens article 10. However, it appears that a greater impact strength can be achieved by forming layer 108 on the concave side.

A suitable method of forming high-impact polymer layer 108 is the injection/coining process disclosed in detail in U.S. Pat. No. 6,270,698 to Pope, which is incorporated by reference herein in its entirety. High-impact polymer layer 108 may be made of any suitable polymer or polymer blend, including a polymer blend, including the polycarbonate/polyethylene teraphthalate blend or methacrylate/butyldyene blend described above, that is made in accordance with the present invention, i.e., generally, by first selecting a first polymer based on its ability to provide one or more desirable characteristics and then blending the first polymer with a second polymer so as to create a blend having both good characteristics and a glass transition temperature lower than the glass transition temperature of the polymer originally selected for its ability to provide the desirable characteristic(s). During the injection/coining process, high-impact polymer layer is molded at a suitable molding temperature, which is generally between about 415° F. and about 480° F. for polycarbonate copolymers and about 400° F. for the acrylic copolymer.

Using the injection/coining process of the Pope patent, using a polycarbonate/polyethylene teraphthalate blend for each of substrate 22 and high-impact polymer layer 108 and using iodine/PVA for filtering layer 18, it was seen that the high-impact polymer layer bonded very well to the substrate and filtering layer did not degrade. In addition, use of this process resulted in minimal residual stress in layer 108. In a particular specimen of lens 100 made using the Pope process with the materials just cited, the overall thickness of the lens was approximately 2. mm. This specimen passed the tests set forth in the American National Standards Institute (ANSI) Z78 Standard for Eye and Face Protection. Specimens of lens 100 thinner than 2.4 mm can also pass these tests, depending upon the materials selected for the various layers of the lens and the level of residual internal stresses remaining in the lens after its manufacture.

Figure 5:
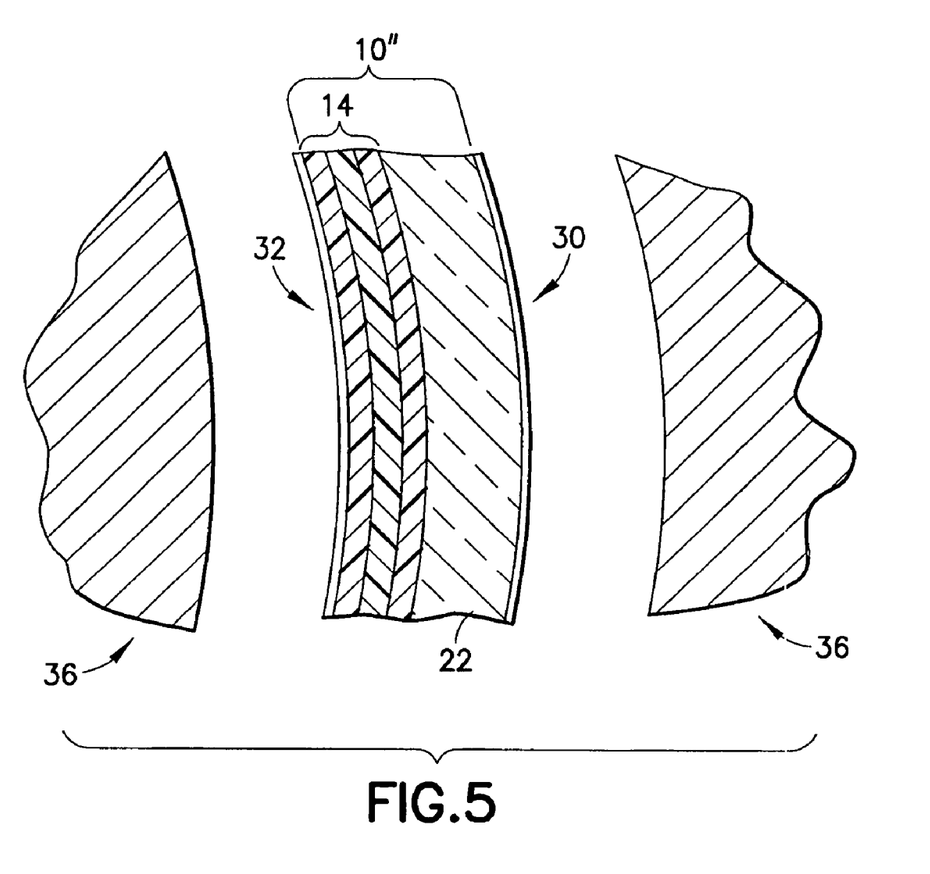
FIG. 5 is a partial cross-sectional view of the mold assembly of FIG. 2 and yet another alternative thermoplastic-based article of the present invention.

FIG. 5 shows a lens article 10" that is similar to lens article 10 of FIG. 2, except that substrate 22 is located on the convex side 30 of the article rather than the concave side 32, as shown in FIG. 2. This may be achieved, e.g., simply by flipping the flat filter 14/substrate 22 precursor to article 10 side 30 for side 32 in thermoforming assembly 36 relative to FIG. 2 prior to thermoforming. All other aspects of article 10" may be the same as described above relative to lens article 10.

The following six examples outline results obtained from different experiments to form example embodiments of article 10 of the present invention. The experiments were carried out to determine the proper process and structure for articles suitable for use as stand-alone polarized lenses, or as inserts for injection-molded polarized lenses.

EXAMPLE 1

An iodine-based polarizer having transmittance for visible light of 37% was bonded between two layers of cellulose acetobutyrate, then bonded to one sheet (substrate) of 0.5 mm thick LEXAN polycarbonate to form the composite structure. Rectangles approximately 60 mm by 70 mm were cut from the composite structure. The composite rectangles were placed in a conventional vacuum thermoformer with spherical cups having a radius of 90 mm. The composite rectangles were heated in the thermoformer to 95° C. for 8 minutes. The curvature of the composite rectangles was very irregular and minimal. However the iodine-based polarizer did not show any degradation during the process. Similar results were obtained when the LEXAN polycarbonate sheets were replaced with sheets of polycarbonate from the Mobay Corp.

EXAMPLE 2

An iodine-based polarizer having transmittance for visible light of 37% was bonded between two layers of cellulose acetobutyrate, then bonded to one sheet (substrate) of 0.5 mm thick LEXAN polycarbonate to form a composite structure. Rectangles approximately 60 mm by 70 mm were cut from the composite structure. The composite rectangles were placed in a conventional vacuum thermoformer with spherical cups having a radius of 90 mm. The composite rectangles were heated in the thermoformer to 140° C. for 8 minutes. The composite rectangles had an irregular curvature that was less than the mold surface curvature. The iodine polarizer was degraded and the cellulose acetobutyrate layers were yellowed and blistered. Similar results were obtained when the sheets of LEXAN polycarbonate were replaced with sheets of polycarbonate from the Mobay Corp.

EXAMPLE 3

Rectangles approximately 60 mm by 70 mm were cut from a sheet (substrate) of 0.5 mm thick blend of 70/30 polycarbonate/polyethylene teraphthalate (XYLEX). The rectangles were placed in a conventional vacuum thermoformer with spherical cups having a radius of 90 mm. The rectangles were heated in the thermoformer to 120° C. for 8 minutes. The resultant curvature of the rectangles was irregular. Further, the polarizer showed slight degradation and the cellulose acetobutyrate showed slight yellowing.

EXAMPLE 4

An iodine-based polarizer having transmittance for visible light of 37% was bonded between two layers of cellulose acetobutyrate, then bonded to one sheet (substrate) of 0.5 mm thick blend of 70/30 polycarbonate/polyethylene teraphthalate (XYLEX). Rectangles approximately 60 mm by 70 mm were cut from the composite structure. The composite rectangles were placed in a conventional vacuum thermoformer with spherical cups having a radius of 90 mm. The composite rectangles were heated in the thermoformer to 120° C. for 8 minutes. The resultant curvature of the rectangles was irregular. Further, the polarizer showed slight degradation and the cellulose acetobutyrate showed slight yellowing.

EXAMPLE 5

An iodine-based polarizer having transmittance for visible light of 37% was bonded between two layers of cellulose acetobutyrate, then bonded to one sheet (substrate) of 0.5 mm thick blend of 50/50 polycarbonate/polyethylene teraphthalate (XYLEX). Rectangles approximately 60 mm by 70 mm were cut from the composite structure. The composite rectangles were placed in a conventional vacuum thermoformer with spherical cups having a radius of 90 mm. The composite rectangles were heated in the thermoformer to 100° C. for 8 minutes. The resultant curvature of the composite rectangles was regular and closely matched the curvature of the mold surface. Further, the iodine polarizer showed no degradation and the cellulose acetobutyrate layers did not yellow or blister. This article can be used as a stand-alone polarizing lens.

EXAMPLE 6

An iodine-based polarizer having transmittance for visible light of 37% was bonded between two layers of cellulose acetobutyrate, then bonded to one layer (substrate) of 50/50 blend of polycarbonate/polyethylene teraphthalate (XYLEX). Rectangles approximately 60×70 mm were cut from the composite structure and were then heated in the thermoformer to 100° C. for 8 minutes. Upon removal from the thermoformer the curvature of the rectangles closely approximated the curvature of the mold surfaces and was uniform. This article was then used as an insert for an injection molded polarized lens.

Although the invention has been described and illustrated with respect to exemplary embodiments thereof, it should be understood by those skilled in the art that the foregoing and various other changes, omissions and additions may be made therein and thereto, without parting from the spirit and scope of the present invention. For example, although the present invention has been described above in connection with ophthalmic lenses, those skilled in the art that the present invention will also be suitable in other optical applications, such as filters for electronic display devices and enclosures (filters) for lamps, to name just a couple.

What is claimed is:

1. A method of making a layered lens article, comprising:
   a) providing a photochromic layer having a minimum degradation temperature;
   b) providing a substrate that includes a polymer blend and that contains a first polymer having a first glass transition temperature higher than said minimum degradation temperature, said polymer blend having a second glass transition temperature lower than said minimum degradation temperature;
   c) placing said photochromic layer and said substrate into working relation with one another so as to form a layered composite; and
   d) thermoforming said layered composite at a temperature below said minimum degradation temperature so as not to degrade the photochromic layer.

2. A method according to claim 1, wherein the photochromic layer includes at least one photochromic substance selected from the group of substances comprising: naphthopyrans, spironapthopyrans, fulgides, fulgimides, salicylates, triazoles, oxazoles, azobenzenes and silver halide.

3. A method according to claim 1, wherein step a) includes providing the photochromic layer with outer protective layers prior to thermoforming.

4. A method according to claim 1, wherein step b) includes forming said polymer blend by blending a second polymer with the first polymer in a predetermined amount that lowers said first glass transition to said second glass transition temperature.

5. A method according to claim 1, wherein step c) includes bonding said photochromic layer and said substrate with one another so as to form said composite.

6. A method according to claim 1, wherein step d) includes thermoforming said composite into one of an ophthalmic lens and a pre-contoured ophthalmic lens insert.

7. A method according to claim 1, further comprising the step of placing a polymer layer into working relation with said composite.

8. A method according to claim 7, wherein the step of placing a polymer layer includes forming said polymer layer by an injection molding process.

9. A method of making a layered lens article that includes a substrate and a photochromic layer having a minimum degradation temperature, the method comprising:
   a) forming the substrate by:
      (i) providing a first polymer having a first glass transition temperature higher than the minimum degradation temperature; and
      ii) blending a second polymer with said first polymer to form a blended polymer having a second glass transition temperature lower than said minimum degradation temperature; and
   b) thermoforming the photochromic layer and the substrate at a temperature lower than said minimum degradation temperature so as to form said layered lens article while avoiding degrading the photochromic layer.

10. A method according to claim 9, including sandwiching the photochromic layer between two protective layers.

11. A method according to claim 9, wherein the first polymer includes a carbonate polymer.

12. A method according to claim 9, wherein the first polymer includes an acrylic polymer.

13. A layered lens article, comprising:
   a) a photochromic layer having a minimum degradation temperature;
   b) a substrate located in working relation with said photochromic layer, said substrate comprising a blend of a first polymer and a second polymer, said first polymer having a first glass transition temperature greater than said minimum degradation temperature, said second polymer selected to cause the blended-polymer substrate to have a second glass transition temperature lower than said minimum degradation temperature so that the photochromic layer and the substrate are thermoformable at a temperature lower than the minimum degradation temperature so as not to degrade the photochromic layer when forming the layered lens article.

14. An article according to claim 13, wherein said photochromic layer includes at least one photochromic substance selected from the group of substances comprising: naphthopyrans, spironapthopyrans, fulgides, fulgimides, salicylates, triazoles, oxazoles, azobenzenes and silver halide.

15. An article according to claim 13, wherein said photochromic layer is sandwiched between first and second protective layers.

16. An article according to claim 13, wherein said photochromic layer and said substrate are operatively configured as an ophthalmic lens.

17. An article according to claim 13, further comprising an injection molded layer in working relation with said photochromic layer and said substrate.

18. An article according to claim 17, wherein said injection molded layer is bonded to said substrate opposite said photochromic layer.

19. An article according to claim 13, further including a thermoplastic polarizing filter arranged adjacent the photochromic layer and/or the substrate.

20. An article according to claim 13, wherein said first polymer is a polycarbonate and second polymer is other than polycarbonate.

21. An article according to claim 13, wherein said first polymer is a polycarbonate.

22. An article according to claim 21, wherein said second polymer is a polyethylene teraphthalate.

23. An article according to claim 13, wherein said first polymer is a poly(methyl methacrylate).

24. An article according to claim 23, wherein said second polymer is a butyldyene.

25. An article according to claim 13, wherein said photochromic layer is sandwiched between cellulose-based protective layers.

* * * * *